United States Patent Office 3,056,845
Patented Oct. 2, 1962

3,056,845
PRODUCTION OF CONJUGATED DIOLEFINES
John Bruce Bennett, Epsom, John Bernard Bream, Banstead, David James Hadley, Epsom Downs, and Barrie Wood, Epsom, England, assignors to British Hydrocarbon Chemicals Limited, London, England, a British company
No Drawing. Filed Aug. 3, 1959, Ser. No. 831,045
Claims priority, application Great Britain Aug. 8, 1958
4 Claims. (Cl. 260—681)

The present invention relates to the production of conjugated diolefines by the reaction of aldehydes with lower mono-olefines.

The condensation of olefines with aldehydes is sometimes called the Prins reaction. Such condensation reactions are capable of yielding a variety of products such as m-dioxanes, unsaturated alcohols, 1:3-diols or conjugated diolefines depending on the reaction conditions employed. The production of conjugated diolefines by the reaction between mono-olefines and aldehydes has been carried out by means of a two-stage process and by a one-stage vapour phase process. A variety of catalysts has been proposed for the one-stage reaction of which the best has appeared to be activated alumina. However, the yields of diolefine and efficiency of conversion of the starting materials have been low, owing apparently to the tendency of the diolefine to react with the aldehyde, forming higher boiling condensation porducts, and also because of the decomposition of formaldehyde to give such products as carbon monoxide. Moreover the yield and efficiency varied so much with time of use that the catalyst had to be revived very frequently. As a result the process has not represented an economic proposition on the industrial scale.

It is an object of the present invention to provide an improved process for the production of conjugated diolefines by the condensation of aldehydes and lower mono-olefines in a single stage reaction, in which improved yields and efficiencies are obtained.

According to the present invention, the process for the production of conjugated diolefines comprises reacting a lower mono-olefins with formaldehyde or acetaldehyde at an elevated temperature in the vapour phase in the presence of a non-volatile acid supported on activated alumina as catalyst, the activated alumina having been heated prior to deposition of the non-volatile acid to a temperature between 900° and 1200° C.

The non-volatile acids used in the preparation of the catalyst include phosphoric acid, molybdic acid, tungstic acid, and iso- and heteropoly acids of molybdenum, tungsten and vanadium such as silicotungstic acid, phosphomolybdic acid and phosphotungstic acid. It is preferred to use phosphoric acid. The non-volatile acid may be deposited on the alumina support either as such or in the form of a heat-decomposable salt of the acid with a volatile base such as ammonia, alkylamines for instance methylamine and ethylamine, and organic bases for instance pyridine. The preferred salt is ammonium phosphate.

The alumina is advantageously free from soluble cations particularly those of the alkali metals, the alkaline earth metals, magnesium and zinc which tend to increase the rate of deposition of carbon on the catalyst. Commercial actviated alumina commonly contains such metals, which can be removed, for instance, by prolonged extraction with hot water.

In the preparation of the catalyst the activated alumina is first heated to a temperature between 900° and 1200° C. The heat treatment is suitably carried out in air for a period of upwards of 20 hours. It has been found that the temperature at which the heat treatment is carried out is quite critical if the optimum yields and efficiencies are to be obtained. The non-volatile acid or acid salt is then deposited onto the alumina support in any suitable manner, for instance by impregnating the heat-treated support with an aqueous solution of the acid or acid salt, and drying the catalyst in air at an elevated temperature.

In the case of the deposition of a heat-decomposable salt of the non-volatile acid on the alumina support, after deposition of the salt, if desired, the catalyst may be heated before use in the reaction to about reaction temperature to decompose the salt to the acid, removing the volatile base. Alternatively, this decomposition can be allowed to take place during the initial stages of the reaction.

The olefines which are suitable for use in the process of the present invention are the lower monoolefines having up to six carbon atoms, and particularly the tertiary olefines, i.e. olefines of the general formula $$R_1R_2C=CHR_3$$

where $R_1$ and $R_2$ are lower alkyl radicals, and $R_3$ is hydrogen or a lower alkyl radical. Olefines which isomerise under the reaction conditions to give tertiary olefines of the type $R_1R_2C=CHR_3$ may also be used. It is particularly preferred to use isobutene, 2-methylbutene-2, and 2-methylbutene-1. The molar proportion of olefine is preferably greater than that of the aldehyde used, and is suitably between 4 and 20 moles per mole of aldehyde.

The aldehydes which can be used is the process of the present invention are formaldehyde and acetaldehyde. The use of formaldehyde is preferred. The formaldehyde is suitably derived from industrial formalin, which is a solution of 36 to 40% by weight of formaldehyde in water, usually containing some methanol. Compounds giving rise to formaldehyde under the reaction conditions, e.g. trioxane and paraformaldehyde, may also be used.

It has also been discovered that the proportion of aldehyde in the reaction gas mixture is quite critical, and it is preferred to use proportions of aldehyde in the total feed of less than 10 mole percent, and preferably between 2 and 10 mole percent. This may be achieved by the use of an inert diluent, for instance, nitrogen, hydrocarbons, such as the lower paraffins, carbon dioxide or steam.

The reaction may be carried out over a wide range of temperatures, for instance between 150° and 400° C. It is preferred to use temperatures in the range 250° to 350° C. The space velocity of the reactants over the catalyst may also vary. In general space velocities between 0.1 and 50 expressed as moles of aldehyde per litre of catalyst per hour are suitable. The optimum space velocity will vary depending on the reaction temperature, and on the activity of the catalyst, and in general it is preferred to use the higher values of space velocities in the range set out with the higher temperatures and vice versa. The reaction is suitably carried out at at atmospheric or at moderately increased pressure, but higher or subatmospheric pressures may be used if desired.

For the process according to the invention the known methods of vapour phase catalysis may be employed. The catalyst may be a stationary or moving bed or a fluidised bed method may be used, but the process of this invention is particularly suited to a fixed bed system. The process is suitably carried out in a continuous manner.

The diolefines can be recovered from the gaseous reaction product in any suitable manner, for instance by condensing the product followed by fractional distillation of the resulting liquid mixture. Unreacted olefines and formaldehyde can be recycled to the catalytic reaction.

A variety of conjugated diolefines can be produced by the process of the invention, including isoprene, from isobutene and formaldehyde.

The diolefines made in accordance with this invention are valuable chemical intermediates, for instance in the preparation of synthetic rubbers.

The process of the invention is further illustrated with reference to the following comparative examples. In the Examples the parts by weight and parts by volume bear the same relationship to each other as do kilograms to litres.

EXAMPLE 1

A series of catalysts was made up consisting of 5% weight/weight ortho-phosphoric acid supported on 8/16 mesh activated alumina which had previously been heated in air at different temperatures for 22 hours.

These catalysts were employed in processes in which a mixture in the vapour phase of formaldehyde (6.15% by volume), isobutene (49.1%) and water (44.75%) was passed over the catalyst at a temperature of 300° C. and a contact time of 2 seconds. The isoprene in the product gas stream was determined at intervals by vapour phase chromatography. The results are shown in Table 1.

Table 1

| Heat treatment ° C. | Catalyst age, hrs. | Percent Yields on formaldehyde fed | | Isoprene efficiency on formaldehyde consumed |
|---|---|---|---|---|
| | | Isoprene | Recovered formaldehyde | |
| 1,350 | ¾ | Trace | 93.7 | |
| | 1¾ | Trace | 94.3 | |
| 1,050 | ½₂ | 39.3 | | |
| | ½ | 29.0 | 60.6 | 73.6 |
| | 1 | 25.7 | | |
| | 1½ | 23.9 | 70.0 | 79.7 |
| | 2½ | 21.0 | 74.8 | 83.4 |
| | 4¼ | 17.7 | 75.3 | 71.7 |
| | 5¼ | 16.6 | 76.9 | 71.9 |
| | 6¼ | 15.2 | 77.5 | 67.6 |
| | 24 | 8.5 | 90.3 | 87.7 |
| | 25 | 8.1 | 90.6 | 86.2 |
| 900 | ⅙ | 27.5 | | |
| | ½ | 48.5 | 4.5 | 50.8 |
| | 1½ | 42.6 | 25.5 | 57.2 |
| | 4 | 32.0 | 33.5 | 48.1 |
| | 5 | 21.4 | 49.6 | 42.5 |
| | 6 | 22.1 | 53.8 | 47.8 |
| | 24 | 13.1 | 65.7 | 38.2 |
| | 28 | 14.0 | 69.7 | 46.2 |
| No heat treatment | ⅙ | 12.3 | | |
| | ½ | 12.1 | 1.2 | 12.3 |
| | 1½ | 5.6 | 2.6 | 5.8 |
| | 4 | 3.0 | 20.0 | 3.8 |

EXAMPLE 2

A catalyst was prepared as follows. 95 parts by weight of activated alumina (8/16 mesh) which had previously been extracted with water for 72 hours to remove inorganic salts, and subsequently heated at 1050° C. for 22 hours, was impregnated with a solution of triammonium phosphate prepared by mixing 26 parts by volume of 2 molar ortho-phosphoric acid, 10.55 parts of 14.8 N ammonia and 26 parts of distilled water. The mixture was well stirred and dried in an oven at 100° C. with frequent stirring. Formalin solution (8% weight/weight formaldehyde) was evaporated into a stream of isobutene to give a reactant mixture containing 47.4% by volume of isobutene, 6.4% of formaldehyde and 46.2% of water. The reactant mixture was passed over the triammonium phosphate/alumina catalyst prepared as described above, at a reaction temperature of 300° C. and a contact time of 6 seconds. The isoprene in the product gas stream was determined by a vapour phase chromatographic method. The results are shown in Table 2.

Table 2

| Catalyst age, hrs. | Percent yields on formaldehyde fed | | Isoprene efficiency on formaldehyde consumed |
|---|---|---|---|
| | Isoprene | Recovered formaldehyde | |
| ⅙ | 13.2 | | |
| ½ | 15.4 | 70.7 | 52.6 |
| 1½ | 21.4 | 73.2 | 86.8 |
| 3¾ | 25.5 | 68.6 | 81.3 |
| 4½ | 25.9 | 68.9 | 83.3 |
| 5½ | 26.1 | 69.3 | 85.1 |
| 23 | 18.2 | 78.0 | 82.8 |
| 26½ | 17.6 | 78.7 | 82.6 |

We claim:

1. The process for the production of conjugated diolefines which comprises reacting a tertiary olefine of 4 to 6 carbon atoms with formaldehyde at an elevated temperature in the vapor phase between 150° and 400° C. in the presence of a non-volatile acid selected from the group consisting of phosphoric and molybdic acids and iso- and hetero-poly acids of molybdenum, tungsten and vanadium supported on activated alumina as catalyst, the activated alumina having been heated prior to deposition of the non-volatile acid to a temperature between 900° and 1200° C.

2. The process of claim 1 in which the non-volatile acid is silicotungstic acid.

3. The process of claim 1 in which the non-volatile acid is phosphomolybdic acid.

4. The process of claim 1 in which the non-volatile acid is phosphotungstic acid.

References Cited in the file of this patent

UNITED STATES PATENTS

| 2,350,485 | Arundale et al. | June 6, 1944 |
| 2,389,205 | Marsh | Nov. 20, 1945 |
| 2,800,518 | Pitzer | July 23, 1957 |
| 2,905,632 | Gladrow et al. | Sept. 22, 1959 |